United States Patent [19]

Arai

[11] 4,399,749
[45] Aug. 23, 1983

[54] METHOD AND APPARATUS FOR CONTROLLING A THERMAL COLOR PRINTER

[75] Inventor: Kiyoshi Arai, Higashikurume, Japan

[73] Assignee: Sony Corporation, Tokyo, Japan

[21] Appl. No.: 403,795

[22] Filed: Jul. 30, 1982

[30] Foreign Application Priority Data

Aug. 8, 1981 [JP] Japan ................. 56-123588

[51] Int. Cl.³ .............. G01D 15/10; H05B 1/00
[52] U.S. Cl. ................... 101/211; 101/426; 400/120; 346/76 PH; 219/216
[58] Field of Search ........... 101/211, 426; 400/120; 346/76 PH; 219/216 PH

[56] References Cited

U.S. PATENT DOCUMENTS

| | | | |
|---|---|---|---|
| 3,554,123 | 1/1971 | Lewallen | 101/211 X |
| 3,567,923 | 3/1971 | Hutchison | 101/426 X |
| 4,250,511 | 2/1981 | Stein et al. | 219/216 PH |
| 4,284,876 | 8/1981 | Ishibashi et al. | 101/426 X |
| 4,364,063 | 12/1982 | Anno et al. | 400/120 X |

FOREIGN PATENT DOCUMENTS

56-115280 9/1981 Japan ................. 400/120

*Primary Examiner*—E. H. Eickholt
*Attorney, Agent, or Firm*—Lewis H. Eslinger; Alvin Sinderbrand

[57] ABSTRACT

A method and apparatus for controlling a printer of the type having plural print heads for printing indicia of different colors by transferring a color dye from a dye medium to a record medium. Each print head is supplied with an energizing signal for a time duration that determines the relative intensity of an indicium printed thereby. Image signals which represent the intensities of the indicia to be printed by corresponding print heads are compared, in a predetermined sequence, to a reference signal whose level changes with time. As each image signal is compared an energizing signal is produced for a duration that is determined by the value of that image signal with respect to the level of the reference signal. The durations of the energizing signals are varied as a function of the print characteristics of the dye medium from which the indicia are printed. Non-linearities in the relationship between the intensity of a color indicium printed from the dye medium and the duration of the energizing signal thus are compensated.

33 Claims, 11 Drawing Figures

FIG.3C  $D_g$ (GRAY SCALE COUNTER)

FIG.3D  $D_I$ (DATA RAM OUT)

FIG.3E  COMPARATOR

FIG.3F  BUFFER

FIG.3G  LATCH

FIG.3H  GATE

FIG.3I  AMP

METHOD AND APPARATUS FOR CONTROLLING A THERMAL COLOR PRINTER

BACKGROUND OF THE INVENTION

This invention relates to a method and apparatus for controlling a printer of the type whereby color indicia are printed by the selective energization of print heads which transfer a color dye from a dye medium to a record medium and, more particularly, to such a method and apparatus which compensates for non-linearities in the print characteristics of the dye medium and especially such non-linearities in the print characteristics of dyes of different colors.

Printing apparatus recently has been introduced for printing viewable images in response to video signals. Such apparatus serves to print a "hard copy" of a television picture. In a desirable embodiment thereof, a color image is printed in response to color video signals.

In the color printing apparatus of the type mentioned above, a pigmented medium is disposed between a record medium, such as paper, and a print head assembly formed of, for example, a plurality of individual print heads. When a particular print head is energized, the color indicium is printed on the record medium as a result of the transfer thereto of at least a portion of the pigment from the pigmented medium. The intensity, or darkness, of the printed indicium is a function of the intensity of the signal that is used to energize that print head.

One example of color printing apparatus of the aforedescribed type utilizes a thermal print head assembly, and is described in copending application Ser. No. 317,055, filed Nov. 2, 1981 now U.S. Pat. No. 4,389,935. In the color thermal printing apparatus disclosed therein, the intensity or darkness of the color indicium that is printed is a function of the duration of the energizing signal that is applied to the thermal print head. The longer the duration of that energizing signal, the darker or more intense the color indicium printed therefrom.

The pigmented medium which is used to print indicia of different colors preferably is in the form of a web containing a repetitive pattern of differently colored sublimable dyes. As described in copending application Ser. No. 384,284, filed June 2, 1982, the sublimable dye or other thermally transferable material vaporizes in response to heat applied thereto, transfers to the record medium and then condenses thereon. When forming a color image, a full image is printed from one colored section of the web in response to energizing signals derived from video signals of one color, and then the web is advanced to print a superimposed image from another colored section of the web in response to energizing signals derived from video signals of another color, and then the web is advanced once again to superimpose yet another colored image on the record medium. The resultant superimposed colored images are perceived as an integrated, full-color image.

It has been found that the print characteristics of the different colored sections of the dye medium used in the aforedescribed thermal print apparatus differ from each other. That is, the darkness, or intensity, of an indicium printed from one colored section in response to an energizing signal of given intensity or duration differs from the darkness or intensity of the image printed from another colored section in response to the same energizing signal. Also, the relationship between the darkness or intensity of indicia printed from a single colored section varies non-linearly with the intensity or duration of the energizing signals that are used to print those indicia. Such non-linearities in the print characteristics of the respective colored sections of the dye medium may be thought of as being analogous to so-called gamma deviations in the color image pick-up tubes used in color television cameras.

OBJECTS OF THE INVENTION

Therefore, it is an object of the present invention to provide an improved method and apparatus for controlling color print apparatus which compensates for the aforementioned differences and non-linearities in the print characteristics of the different colored sections of the dye medium that is used to print color indicia in such apparatus.

Another object of this invention is to provide an improved method and apparatus for controlling a color printer of the aforementioned type wherein good and accurate color indicia are printed in response to color image signals.

A further object of this invention is to provide a method and apparatus for controlling a color thermal printer wherein the darkness or intensity of the image printed therefrom is determined by the duration that heat is applied to the dye medium used therein, and wherein such duration is varied or adjusted to compensate for different print characteristics of different colored sections of that dye medium.

An additional object of this invention is to provide, in a color thermal printer of the type having a dye medium formed of sections of different color dyes which exhibit different non-linear print characteristics, a method and apparatus for compensating for such differences and non-linearities so that indicia of the same relative darkness or intensity are printed therefrom in response to the same image signals.

Various other objects, advantages and features of the present invention will become readily apparent from the ensuing detailed discussion, and the novel features will be particularly pointed out in the appended claims.

SUMMARY OF THE INVENTION

In accordance with this invention, a method and apparatus are provided for controlling a printer of the type having plural print heads for printing indicia of different colors by transferring a color dye from a dye medium to a record medium. Each print head is supplied with an energizing signal for a time duration that determines the relative darkness or intensity of an indicium printed thereby. Image signals, which represent the intensity of the indicia to be printed by corresponding print heads, are compared, in a predetermined sequence, to a reference signal whose intensity level, or value, changes with time, to produce respective energizing signals. Each energizing signal is produced for a duration that is determined by the value of a corresponding image signal with respect to the reference signal. In one embodiment, the reference signal increases with time, such as in a step-wise manner, and each respective energizing signal commences from the time that the reference signal is incremented to be at least equal to the level, or value, of the corresponding image signal. A primary feature of this invention is to vary the durations of the energizing signals as a function of the print characteristics of the dye medium from which the print heads print the indicia.

In accordance with one aspect of this invention, the printer is a thermal printer, and the indicia are printed by applying heat from the print heads to the dye medium, whereby the darkness or intensity of the indicia printed from the dye medium is a function of the duration of the heat that is applied thereto. The dye medium preferably is formed of different colored sections; and the present invention proceeds upon the recognition that the print characteristics of one colored section differ from those of another. This invention also recognizes that the relationship between the darkness or intensity of an image printed from a particular colored section of the dye medium varies non-linearly with the duration that heat is applied thereto. Accordingly, it is a feature of this invention to vary the duration during which heat is applied so as to compensate for such differences and non-linearities.

As an aspect of this feature, the duration that heat is generated by the thermal print heads is an integral number of unit heating times. To compensate for the aforementioned differences and non-linearities of the print characteristics, the duration of the basic unit heating time is adjusted. This adjustment in the duration of the unit heating time is achieved economically, simply and advantageously by the use of digital circuitry.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
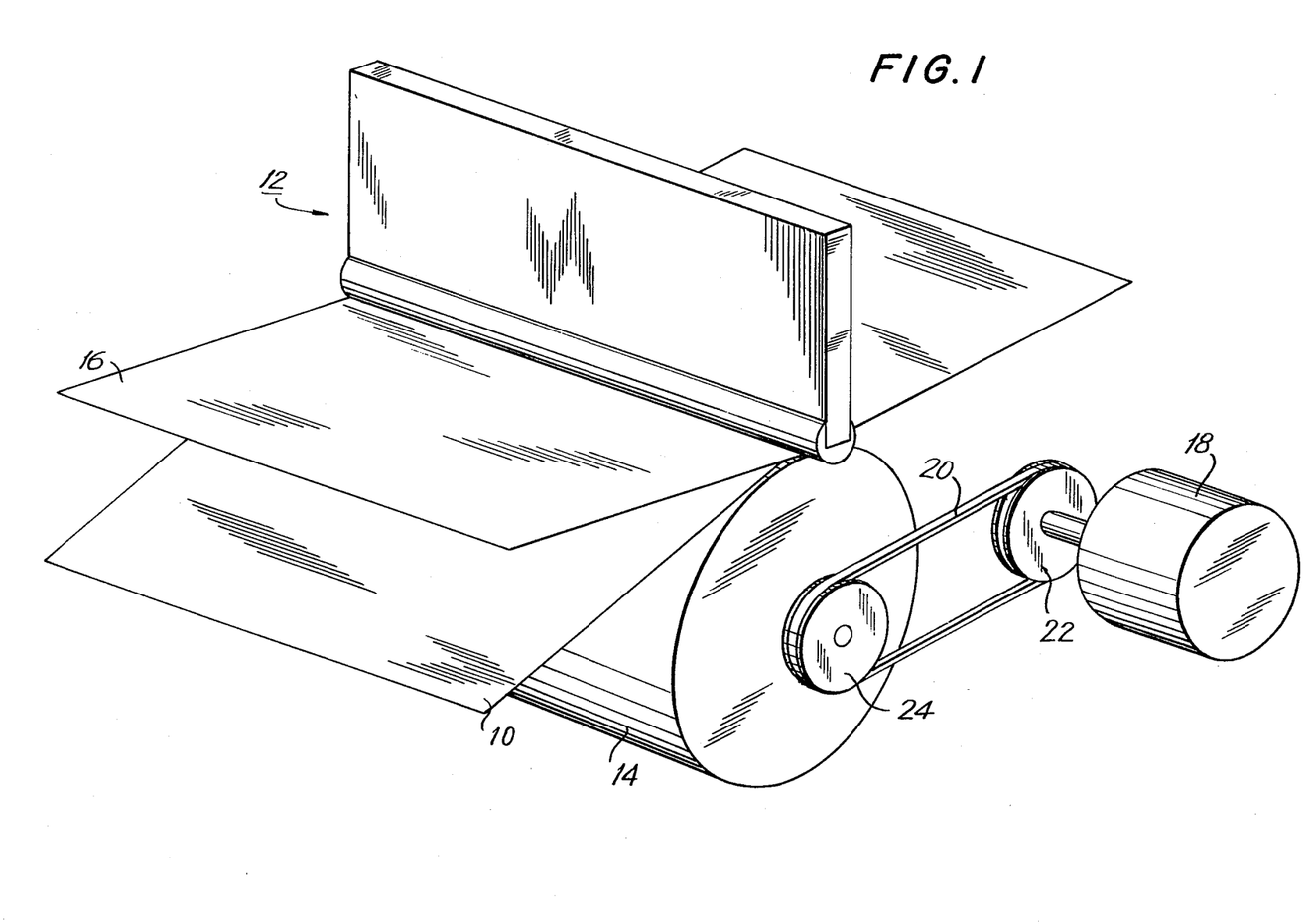
FIG. 1 is a perspective view of a portion of the printer with which the present invention finds ready application.

Referring now to the drawings, and initially to FIG. 1 thereof, a portion of print apparatus with which the present invention finds ready application is illustrated. The print apparatus is adapted to print color indicia on a record medium 10 such as paper. This is achieved by the combination of a print head assembly 12, a rotatable platen 14 and a dye medium 16. Platen 14 is mechanically coupled to a drive motor 18 via a transmission belt 20 which is deployed about motor pulley 22 and platen pulley 24. As illustrated, the motor pulley is coupled to a drive shaft of motor 18 and is rotated by the motor. Platen pulley 24 is mechanically coupled to platen 14 and, when driven by transmission belt 20, serves to rotate the platen. In a preferred embodiment, drive motor 18 is a stepping motor adapted to rotate platen 14 by a predetermined angular increment in step-wise fashion.

Platen 14 is adapted to receive and secure a sheet a paper 10 and, when the platen is rotated, paper 10 likewise is rotated. In particular, the rotation of platen 14 serves to rotate paper 10 past a fixed print region at which print head assembly 12 is fixedly disposed. The print head assembly is comprised of a plurality of individual, adjacent print heads $12_1$, $12_2$, . . . $12_{256}$, best shown and described with respect to FIG. 2.

Dye medium 16 preferably is in the form of a web of thermally transferable dye. Although not shown, the web may be bi-directionally movable between supply and take-up reels, and has a run interposed between print head assembly 12 and platen 14, as illustrated. In one embodiment of the printer, the web is formed with a repeated sequence of respective sections, or frame, of thermally transferably dye, each frame or section in a sequence having a different color. For example, each sequence of sections may include a section of yellow thermally transferable dye followed by a section of magenta thermally transferable dye followed by a section of cyan thermally transferable dye. This sequence of yellow, magenta and cyan is repeated. The thermally transferable dye may be replaced by a thermally activatable ink or other suitable material. In the preferred embodiment, the dye is a sublimable material which vaporizes in response to heat applied thereto by print head assembly 12, transfers to record medium 10 and then condenses thereon.

In operation, platen 14 is rotated by motor 18. As the platen rotates, such as in a step-wise manner, it brings successive, contiguous areas of record medium 10 into the print region opposite print head assembly 12. Dye medium 16 is pinched between the print head assembly and the record medium. Energizing signals, described below, are supplied to print head assembly 12 and selectively energize the thermal elements included in that assembly so as to transfer dye from a section on dye medium 16 to record medium 10. As the record medium moves through the print region, the selective energization of print head assembly 12 results in the printing of a color image on the record medium. The color of this image is determined by the color of the thermally transferable dye contained in the section of dye medium 16 that now is driven past the print region. After one complete color frame of the video image has been printed, record medium 10 is returned to an initial, or "home" position, dye medium 16 is advanced to print another color section into position for printing, and print head assembly 12 is selectively energized so as to print the next color frame of the video image superimposed onto the first printed image.

Figure 2:
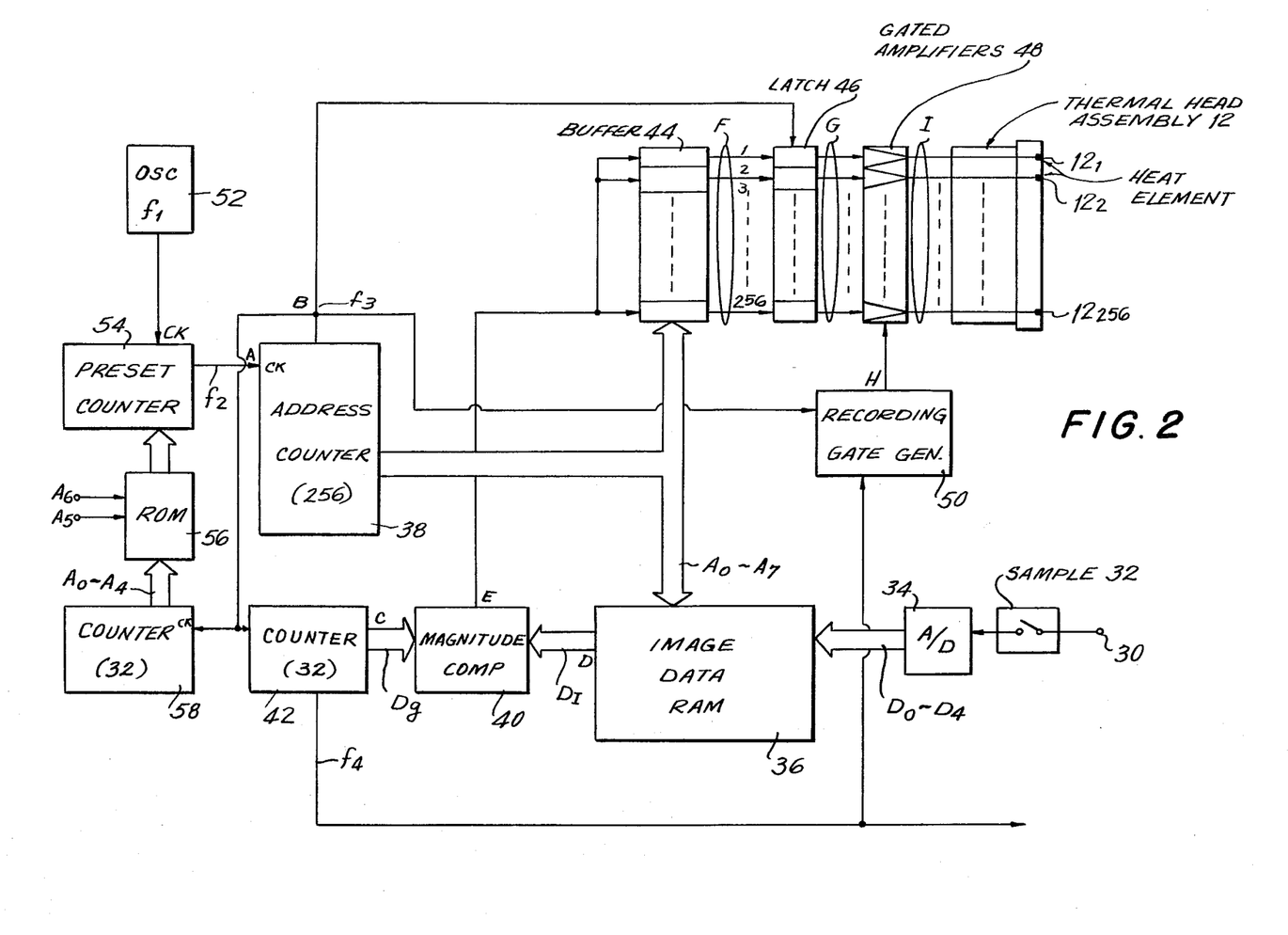
FIG. 2 is a block diagram of apparatus incorporating the present invention for controlling the printer.

FIG. 2 illustrates the control apparatus by which print head assembly 12 is selectively energized to print the respective, superimposed color frames of the video image on record medium 10. The print head assembly is energized in response to color video signals that represent a "still" field or frame of a television picture. As a numerical example, the print head assembly is formed of 256 individual print heads, or thermal elements, one print head for each horizontal line of the image to be printed. The field or frame interval of the video signal may be thought of as being divided into separate picture elements for each horizontal line. The video signal is sampled at a rate to produce, for example, picture element #1 in line interval #1, picture element #1 in line interval #2, picture element #1 in line interval #3, and so on, up until picture element #1 in line interval #256. Then, the input video signal is sampled to produce picture element #2 in line interval #1, picture element #2 in line interval #2, and so on, up until picture element #2 in line interval #256. This sampling process is repeated so as to produce, in succession, samples of a particular picture element in each line interval followed by samples of the next picture element in the line intervals, and so on. The successive samples of a particular picture element in each line interval are used to energize print heads $12_1, 12_2, \ldots 12_{256}$ to produce a vertical line of corresponding indicia. Then, when the next picture element in each horizontal line interval is sampled, print heads $12_1, 12_2, \ldots 12_{256}$ are energized in response thereto so as to print the next adjacent vertical line of indicia. This process is repeated so as to print successive vertical lines resulting in a printed image of a color corresponding to the particular colored section of dye medium 16 from which the image then is being printed.

The apparatus for producing and supplying respective energizing signals to print head assembly 12 is comprised of a sampling circuit 32, an analog-to-digital (A/D) converter 34, an image signal memory 36, an address generator 38, a comparator 40, a reference signal generator 42, a buffer 44, a latch circuit 46 and gated amplifiers 48. Sampling circuit 32 is coupled to a video input terminal 30 to receive video signals representing a field or frame of a television picture. It will be appreciated that the video signals need not necessarily be derived from a television picture but, rather, merely may represent a field or frame of a video image, Preferably, the field or frame is a "still" field or frame such that the video signals supplied to input terminal 30 may be thought of as being "refreshed" video signals. That is, the field or frame of video signals is cyclically supplied to input terminal 30.

Sampling circuit 32 is adapted to sample a respective picture element in each line interval (or, alternatively, in selected line intervals) of the field or frame of still video signals supplied thereto. For example, picture element #1 in successive line intervals is sampled in a field or frame interval; and then, when the field or frame interval is re-cycled, picture element #2 in successive line intervals is sampled; and in the following re-cycling of the field or frame interval, picture element #3 in successive line intervals is sampled and so on. The sampled picture elements in successive line intervals are supplied in sequence to A/D converter 34.

The A/D converter may be of conventional construction and is adapted to produce, for example, a 5-bit digital signal representing the level of the sampled picture element. It is appreciated that A/D converter 34 is adapted to produce successive 5-bit digital signal representations of the corresponding picture element samples supplied thereto. Of course, if desired, the A/D converter may be adapted to produce a digital signal of any suitable number of bits. A/D converter 34 is coupled to image signal memory 36, the latter being adapted to store the successive, digitized picture element samples produced by the combination of sampling circuit 32 and A/D converter 34.

Preferably, image signal memory 36 is an addressable random access memory (RAM) having a number of addressable storage locations at least equal to the number of digitized picture elements that are produced during a single field or frame interval. In the numerical example described herein, 256 digitized picture element samples are produced and, accordingly, RAM 36 preferably has at least 256 addressable storage locations for storing respective ones of such digitized picture element samples. The stored, digitized picture element samples are referred to herein as image signals.

RAM 36 is coupled to an address generator 38 which is adapted to generate successive address signals in a predetermined sequence. During a write-in mode, successive storage locations of RAM 36 are addressed, and successive image signals are stored in such addressed storage locations. Preferably, the addressing of RAM 36 is in synchronism with the production of image signals by A/D converter 34. If RAM 36 is provided with 256 addressable storage locations, for example, then address generator 38 is adapted to generate an 8-bit address word formed of, for example, address bits $A_0$–$A_7$. As will be described, the address generator may be comprised of a counter supplied with address clock pulses of a repetition rate which determines the rate at which successive storage locations in RAM 36 are addressed.

RAM 36 also is operated to exhibit a read-out cycle during which the image signals stored therein are read out in predetermined sequence. Address generator 38 functions to address the storage locations in the RAM during this read-out cycle so as to read out the image signals stored therein. The output of RAM 36 from which such stored image signals are read is coupled to one input of a comparator 40. This comparator includes another input which is coupled to the output of a reference signal generator 42. The reference signal generator is adapted to produce a reference signal representative of an intensity level. The value of the reference signal and, thus, the intensity level representation, varies with respect to time. In the embodiment described herein, the reference signal is incremented in a step-wise manner. Preferably, the intensity level representation of the reference signal incrementally increases. Alternatively, however, the intensity level representation of the reference signal may incrementally decrease. Accordingly, reference signal generator 42 may comprise a counter, referred to herein as a gray scale counter, whose count incrementally changes in response to pulses supplied thereto so as to produce a changing intensity level representation corresponding to, for example, a gray scale. As illustrated in FIG. 2, the counter which comprises reference signal generator 42 includes a pulse input coupled to an output of address generator 38 and is adapted to receive output pulses produced by the address generator as will be described.

As mentioned above, comparator 40 is adapted to compare the respective image signals read out from RAM 36 to the reference signal produced by reference signal generator 42. After all of the read out image signals have been compared to the reference signal, the latter is incremented, as by incrementing the count of the counter which comprises reference signal generator 42, and then the respective image signals are read out from RAM 36 once again, and each is compared to the incremented reference signal. This process continues until the reference signal has been incremented to its maximum level. At that time, a new set of image signals is stored in RAM 36, this new set representing the next picture element in each horizontal line interval, and the foregoing process whereby the image signals stored in RAM 36 are compared, in predetermined sequence, to the incrementing reference signal produced by reference signal generator 42, is repeated.

In one embodiment of the present invention, an image signal having maximum value represents an indicium having the brightest level, such as white, and image signals having lower values represent indicia that are darker and, thus, have a greater intensity of the color to be printed. Thus, an indicium having darker or more intense color is printed in response to an image signal having a relatively lower value. Comparator 40 is adapted to produce a binary "0" when an image signal $D_I$ read out from RAM 36 is greater than the reference signal $D_g$ then produced by reference signal generator 42; and the comparator is adapted to produce a binary "1" when the value of the image signal is less than the value of the reference signal. Stated otherwise, $D_g < D_I \rightarrow$ "0"; and $D_g \geq D_I \rightarrow$ "1". Of course, the duration of the output signal produced by comparator 40 is determined by the value of the image signal $D_I$ with respect to the level of the reference signal $D_g$. It is appreciated that the level of the reference signal increases periodically. The output signal produced by the comparator thus is changed over from a binary "0" to a binary "1" when the reference signal has been incremented to a value which is at least equal to the value of the image signal to which it is compared. Hence, the duration of the output signal produced by comparator 40 is a function of the length of time for the reference signal to be incremented from its minimum value to a value at least equal to the image signal.

As mentioned above, in one embodiment, the image signals are formed of 5-bit digital signals. The reference signal likewise may be a 5-bit digital signal. It is recognized that the number of bits included in the reference signal preferably should be equal to the number of bits which comprise the respective image signals. If the reference signal is a 5-bit digital signal, then this reference signal is incremented in thirty-two successive steps. Accordingly, the image signals stored in RAM 36 are cyclically read out therefrom a maximum of thirty-two successive times. It is expected that, at some time during this cyclical reading out of the image signals, the reference signal will be increased to a level which is equal to or greater than at least some of those image signals. At that time, corresponding energizing signals produced by comparator 40 commence and, as will be described, all energizing signals terminate at a predetermined, fixed time.

The output, or energizing signals produced by comparator 40 are coupled to buffer 44. This buffer may comprise a random access memory and, accordingly, may be similar to RAM 36. As illustrated, buffer 44 also is coupled to address generator 38 which supplies thereto the same addresses, in the same predetermined sequence, as are supplied to RAM 36 to read out the stored image signals from the latter. It will be recognized that buffer 44 is adapted to store in a location corresponding to the location from which an image signal is read out from RAM 36, the energizing signal associated with that image signal. As the value of the reference signal produced by reference signal generator 42 increases, it is expected that the energizing signals stored in the respective storage locations of buffer 44 will change over, at times determined by the image signals read out from RAM 36, from a binary "0" to a binary "1".

The energizing signals stored in buffer 44, which may change from binary "0" to binary "1" during various times that the reference signal value is increased, are supplied, in parallel, to respective locations in latch circuit 46. The latch circuit is adapted to function as a temporary storage circuit and is supplied with the output pulse that is produced by address generator 38 to increment the counter which comprises reference signal generator 42. This output pulse serves to update the contents of the latch circuit at the end of each read-out cycle.

The energizing signals temporarily stored in latch circuit 46 are supplied therefrom to gated amplifiers 48, these amplifiers serving to supply suitable energizing currents or voltages to the individual print heads included in print head assembly 12. Gated amplifiers 48 may be comprised of individual amplifying circuits, each having gate terminal coupled in common to a gate signal generator 50. This gate signal generator also is coupled to receive the output pulses produced by address generator 38 and is adapted to generate a gate signal which commences after a predetermined number of such output pulses have been produced. That is, after a predetermined number of read-out cycles, whereupon the reference signal has been incremented to a predetermined value, gate signal generator 50 supplies the gate signal to gated amplifiers 48. The gate signal generator also is coupled to reference signal generator 42 to receive a "terminate" signal when the reference signal has been incremented to its maximum value. Alternatively, this "terminate" signal may be produced when the reference signal is incremented to any desired predetermined value. Gate signal generator 50 terminates the gate signal supplied to gated amplifiers 48 in response to this "terminate" signal. It is appreciated that, when the gate signal terminates, the energizing signals supplied to the respective print heads of print head assembly 12 all terminate. The "terminate" signal produced by the reference signal generator also is used to step motor 18 (FIG. 1) to advance paper 10 so that the next adjacent vertical line may be printed thereon.

The manner of operation of the circuitry shown in FIG. 2 and thus far described now will be explained. A signal processing circuit (not shown) whose output is coupled to video input terminal 30 functions to separate the field or frame interval of still video signals into separate color components, such as yellow, magenta and cyan components. Let it be assumed that a field or frame interval of one of those color components, such as the yellow video component signals, is supplied to input terminal 30. Sampling circuit 32 and A/D converter 34 function to produce respective image signals which, if used to produce corresponding video indicia, would appear as a vertical yellow line of varying intensity. These image signals are stored in respective storage locations of RAM 36 during a write-in cycle and under the control of address generator 38.

Once these image signals are stored in RAM 36 they are read out therefrom again under the control of address generator 38, in a predetermined sequence. Following each read-out cycle, the counter which comprises reference signal generator 42 is incremented by the output pulse produced by the counter which comprises address generator 38 so as to increment the reference signal produced thereby in successive read-out cycles. During each read-out cycle, the predetermined sequence of image signals read out from RAM 36 is compared to the then-present value of the reference signal. Depending upon whether a respective image signal is greater or less than the value of the reference signal, a binary "0" or "1", respectively, is stored in a corresponding location of buffer 44. Hence, at the completion of a read-out cycle, buffer 44 stores energizing signals which are derived from the respective image signals. During the next read-out cycle, some of the energizing signals stored in buffer 44 may change depending upon whether the value of the reference signal now exceeds the image signals to which it is compared.

At the completion of each read-out cycle, or stated otherwise, at the beginning of a read-out cycle, the contents of latch circuit 46 are updated with the energizing signals then present in buffer 44. Thus, the contents of the latch circuit are adjusted, or updated, in timed synchronism with the output pulses produced by address generator 38.

After the reference signal has been incremented to a predetermined value, that is, after a predetermined number of output pulses have been generated by address generator 38, gate signal generator 50 supplies the gate pulse to gated amplifiers 48, whereupon the contents of latch circuit 46 are amplified and supplied as energizing signals to print head assembly 12. At some time during the gate signal interval, it is expected that at least some of the energizing signals will be changed over from binary "0"s to binary "1"s. At such times, corresponding print heads included in print head assembly 12 are energized. These print heads remain energized until the termination of the gate signal, as when the reference signal is incremented to a predetermined value.

The foregoing operation now will be further described with reference to the timing diagrams illustrated in FIGS. 3A–3I. For simplification, let it be assumed that each image signal may be quantized to four separate quantizing levels having corresponding values 0, 1, 2 and 3. It is appreciated, therefore, that each image signal may be a 2-bit digital signal. Let it also be assumed that print head assembly 12 is formed of only four print heads, and these four print heads may be designated as heads A, B, C and D. Finally, since the image signals may be quantized to four quantizing levels, it is appreciated that the reference signal generated by reference signal generator 42 is incremented from a minimum value, which represents a corresponding intensity level of the indicia to be printed in response to the image signals, (e.g. 0) to a maximum value, or intensity level representation (e.g. 3).

Figure 3A:
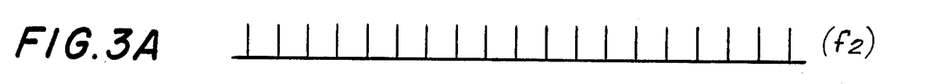
FIGS. 3A-3I are timing diagrams which are useful in understanding the operation of the apparatus shown in FIG. 2.
Figure 3B:
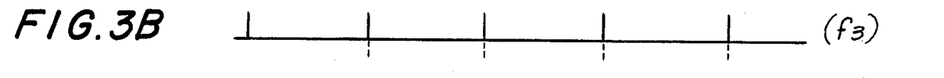

With the foregoing simplification, address generator 38 is supplied with address clock pulses A shown in FIG. 3A. Let it be assumed that the repetition rate of these address clock pulses A is represented as $f_2$. Address generator 38 responds to each address clock pulse A to produce a new address signal. As mentioned above, the address generator may include a counter whose count is incremented by the address clock pulses. This count is used as the read-out addresses for RAM 36. The counter preferably is a cyclical counter and, after all the address signals have been generated, the count of this counter is reset to its initial count, and a carry pulse, referred to hereinabove as the output pulse, is produced. This output pulse B is illustrated in FIG. 3B and exhibits the repetition rate $f_3$, wherein $f_3 < f_2$. In the simplified example described herein, it has been assumed that print head assembly 12 is comprised of four print heads and, therefore, RAM 36 is provided with four storage locations in which four separate image signals are stored. Hence, the counter included in address generator 38 is incremented from a count of 0 to a count of 4. Accordingly, in this example, $f_3 = f_2/4$. In a more practical embodiment wherein print head assembly 12 is comprised of 256 print heads, RAM 36 includes 256 storage locations, the counter included in address generator 38 is incremented from a count of 0 to a count of 256, and $f_3 \times f_2/256$.

Figure 3C:
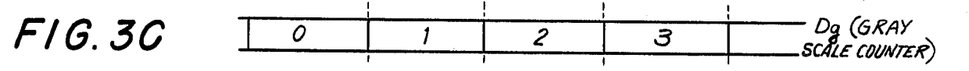

The reference signal produced by reference signal generator 42 is incremented in response to each output pulse B. This reference signal C thus is incremented as follows: 0, 1, 2, 3, 0, 1, 2, ... and so on, as illustrated in FIG. 3C. That is, the reference signal is incremented once at each RAM read-out cycle.

Figure 3D:
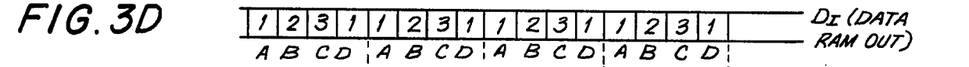

The image signals stored in RAM 36 are read out therefrom in accordance with the predetermined sequence established by the addresses generated by address generator 38. Such read out image signals D are represented in FIG. 3D having respective values 1, 2, 3, and 1 which represents the intensities of the indicia printed by the corresponding print heads A, B, C and D, respectively. During each read-out cycle, these image signals are read out from RAM in the illustrated sequence.

Figure 3E:
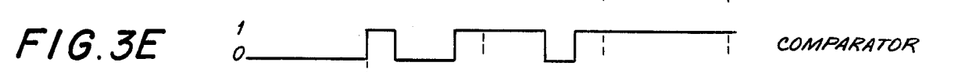

The sequentially read out image signals are compared, one-by-one, to the then-present value of the reference signal. Thus, during the first read-out cycle, the image signals are compared to the reference signal representing the intensity level 0. During the next read-out cycle, the image signals are compared to the reference signal representing the intensity level 1, and so on. Comparator 40 produces the energizing signals E shown in FIG. 3E as a result of this comparison. Thus, and as described above, comparator 40 produces a binary "0" when a read-out image signal exceeds the intensity level represented by the reference signal; and the comparator produces a binary "1" when the read-out image signal is equal to or less than the intensity level represented by the reference signal. As illustrated in FIG. 3E, when the reference signal has been incremented to the level equal to the value of the image signals associated with print heads A and D, comparator 40 produces a binary "1" in response to the reading out of such image signals. Then, when the reference signal has been further incremented to a level equal to the value of the image signal associated with print head B, the comparator produces a binary "1" when that image signal is read out as well as when the image signals associated with print heads A and D are read out. Finally, when the reference signal has been incremented to a level equal to the value of the image signal associated with print head C, comparator 40 produces a binary "1" when that image signal as well as when all of the remaining image signals are read out from RAM 36.

Figure 3F:
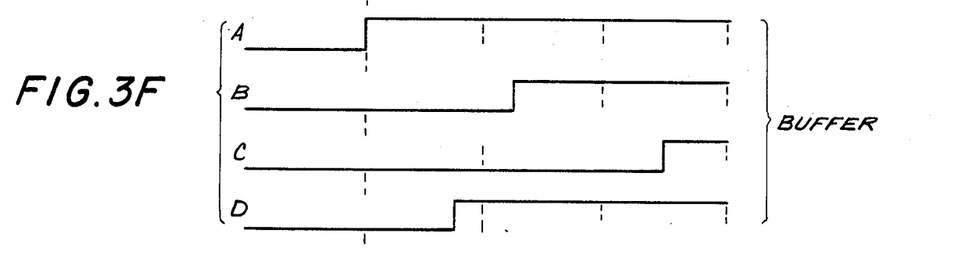
Figure 3G:
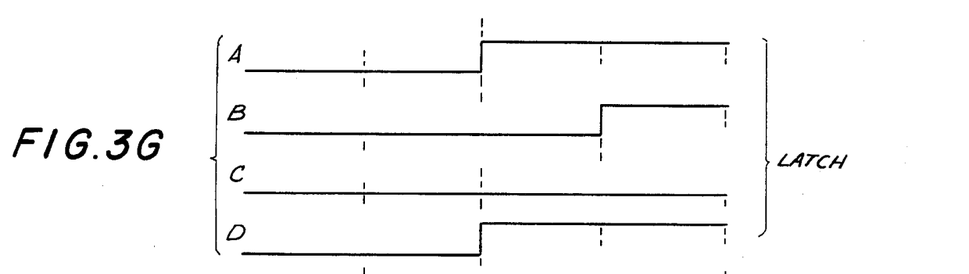

The energizing signals E (FIG. 3E) produced by comparator 40 are supplied and stored in the respective elements of buffer 44. These stored energizing signals F are illustrated in FIG. 3F. Thus, the energizing signal stored in the element that is associated with print head A is changed over from a binary "0" to a binary "1" at the time that the energizing signal produced for print head A by comparator 40 changes over. Likewise, the energizing signal stored in the element of buffer 44 associated with print head B changes over from a binary "0" to a binary "1" when the output of comparator 40 which is associated with this print head changes over. The remaining timing waveforms shown in FIG. 3F likewise illustrate that the respective energizing signals are stored in corresponding elements of buffer 44 at the time that such energizing signals are changed over from a binary "0" to a binary "b 1" by the comparator.

Figures 3H, 3I:
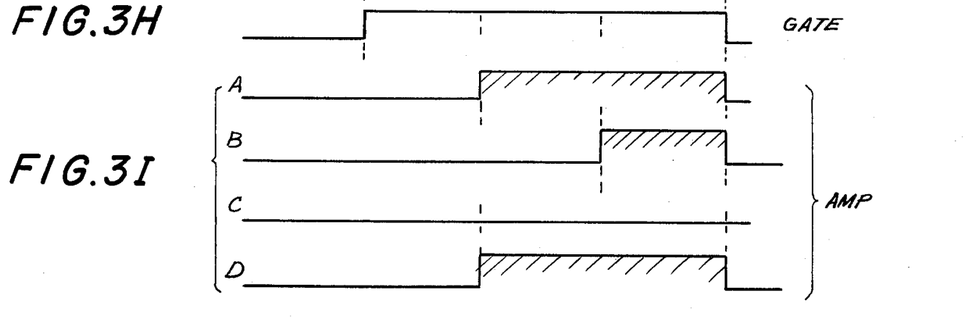

The respective energizing signals provided by buffer 44 are stored in latch circuit 46 in timed synchronism with the output pulses B produced by address generator 38. Hence, the latch circuit temporarily stores such energizing signals at the times illustrated in FIG. 3G. These temporarily stored energizing signals G are amplified and supplied to print head assembly 12 by gated amplifiers 48, as shown in FIG. 3I. The gated amplifiers are turned on, or enabled, by the gate signal H shown in FIG. 3H and produced by gate signal generator 50. It is appreciated that the gate signal H commences with the first output pulse produced by address generator 38 and terminates when the reference signal produced by reference signal generator 42 has been incremented to a predetermined value which, in the present example, is assumed to be the maximum value. Those energizing signals which are temporarily stored in latch circuit 46 during the gate signal interval are applied to the respective heads of print head assembly 12.

It is seen, from FIG. 3I, that the duration of the energizing signal supplied to a respective print head is a function of the value of the corresponding image signal which has been read out from RAM 36. Those image signals having relatively lower values result in energizing signals of greater duration which produce indicia of greater intensity. That is, the indicia are relatively darker. The image signal which is used to energize print head C, for example, exhibits the maximum value and, thus, print head C is not energized in response thereto. Accordingly, a light or white indicia results from this print head.

In the embodiment described herein, the respective energizing signals commence at time which are determined by the relative value of the image signals, but such energizing signals terminate concurrently upon the termination of the gate signal H. Alternatively, all of energizing signals may commence concurrently, such as at the commencement of gate signal H, and may terminate at different times depending upon the relative values of the respective image signals.

In the preferred embodiment, the printer with which the present invention is used is a thermal printer. Thus, the energizing signals supplied to print head assembly 12 energize the respective print heads so as to generate heat. The amount of heat which is generated and, thus, the intensity or darkness of the indicia printed by the print head assembly, is determined by the duration of the energizing signals supplied thereto. It is appreciated that the output pulses B produced by address generator 38 established unit heating times. That is, the period of such output pulses establishes such unit heating times. From FIGS. 3G and 3I, it is seen that the energizing signals which are supplied to print heads A and D are supplied thereto for two heat time units. The energizing signal supplied to print head B is supplied thereto for one heat time unit. Hence, the amount of heat which is generated by each print head and, thus, the intensity or darkness of the indicium printed therefrom, may be increased or decreased by selectively increasing or decreasing the period of duration of each heat time unit. The apparatus now described functions to vary the duration of the energizing signals by varying the period or duration of the heat time units so as to compensate for non-linearities in the print characteristics of each respective section of colored dye of dye medium 16, and also to compensate for differences in the print characteristics from one section thereof to another.

The relationship between the intensity or darkness of the indicium printed by a print head and the length of time, or duration, that heat is generated by the head may be non-linear. Ideally, this relationship is linear. In accordance with one aspect of the present invention, this non-linearity is compensated. For example, and with reference to the simplified example described above with respect to the timing diagrams illustrated in FIG. 3, it may be that, in order to produce an indicium having the desired intensity or darkness in response to an image signal whose value is 1, such as the indicium printed by print head A, this print head should be energized for a duration that is slightly greater than 2 heat time units. Likewise, in order to produce the indicium of desired intensity or darkness in response to the image signal having the value 2, the duration of the energizing signal may have to be reduced to be slightly less than 1 heat time unit. This non-linearity in the relationship between the darkness of the printed indicium and the duration of the energizing signal which is used to print that indicium (i.e. the heating time) is a function of the particular characteristics of the dye or thermal transfer material which is used. Such characteristics may be readily ascertained such as by measuring the intensity or darkness of the indicia produced in response to energizing signals of progressively increasing or decreasing duration. As a result, compensating changes in the period of the output pulses B produced by address generator 38 may be established for each incremental level of the image signal.

The compensating changes in the period of the output pulses B produced by address generator 38 are obtained by the combination of a source of clock pulses 52, a variable frequency divider 54, a memory, such as a read only memory (ROM) 56 and an address generator 58. Source 52 preferably is a stable oscillator which generates clock pulses having a substantially fixed frequency. The oscillator may be, for example, a quartz oscillator. The clock pulses having a repetition rate of, for example, $f_1$, are coupled to variable frequency divider 54 wherein the frequency or repetition rate of such clock pulses is divided by a presettable dividing ratio. The dividing ratio of the variable frequency divider is established by a digital dividing ratio signal supplied thereto by ROM 56. Thus, oscillator 52, variable frequency divider 54 and ROM 56 function in a manner similar to the digital tuning circuitry used in frequency synthesizer tuners found in high fidelity radio receiving equipment. If the dividing ratio signal supplied by ROM 56 establishes a dividing ratio x, then variable frequency divider 54 functions to produce the address clock pulses A having the frequency $f_2 = f_1/x$.

Preferably, ROM 56 is provided with a plurality of storage sections, each section being associated with a respective colored section of dye medium 16. Each of these sections is adapted to store plural dividing ratio signals, each dividing ratio signal serving to adjust the frequency $f_2$ of the address clock pulses A so as to compensate for the aforementioned non-linearities in the print characteristics of the particular section of the dye medium which then is present for printing. ROM 56 includes address terminals $A_5A_6$ to which a section address signal is supplied. This section address signal may be produced in synchronism with the movement of dye medium 16 so as to, for example, select the section in ROM 56 associated with the yellow section of dye medium when that yellow section is advanced to the print head assembly, to select the cyan section of the ROM when the cyan section of the dye medium is advanced, to select the magenta section of the ROM when the magneta section of the dye medium is advanced, and so on. ROM 56 also includes address terminals $A_0$–$A_4$ which are supplied with sequential 5-bit address signals generated by address generator 58.

The address signals generated by address generator 58 serve to address the respective storage locations in the selected section of the ROM. These storage locations have stored therein the aforementioned dividing ratio signals. It is seen that address generator 58 is supplied with output pulses B produced by address generator 38. Preferably, address generator 58 includes a counter whose count is incremented in response to each of these output pulses. The particular count then produced by the cunter is used to address ROM 56.

Since the counter included in address generator 58 is incremented in synchronism with the counter included in reference signal generator 42, it is appreciated that the dividing ratio signals read out of ROM 56 and supplied to variable frequency divider 54 are those dividing ratio signals which are used to compensate the non-linearities in the print characteristics as the intensity or darkness of the printed indicia changes. Hence, as the level or value of the reference signal produced by reference signal generator 42 progressively increases, ROM 56 is correspondingly addressed so as to supply to variable frequency divider 54 the particular dividing ratio signals by which the non-linearities in the print characteristics may be compensated. Where the duration of the energizing signal for a particular level of the image signal should be slightly reduced, the dividing ratio signals supplied to variable frequency divider 54 tends to increase the frequency $f_2$ of address clock pulses A. This increases the read-out rate of RAM 36 and, moreover, correspondingly reduces the period or interval of output pulses B, thereby reducing the duration of the energizing signal. Conversely, if an increase in the duration of the energizing signal is needed in order to produce an indicium having the desired darkness, the dividing ratio signal supplied to variable frequency divider 54 from ROM 56 tends to decrease the frequency $f_2$ of address clock pulses A.

In the example illustrated in FIG. 2, the frequency or repetition rate $f_2$ of address clock pulses A may be represented as $f_2=f_1/x$; the frequency or repetition rate of the output pulses B produced by address generator 38 (and, thus, the RAM read-out cycle rate) may be expressed as $f_3=f_2/256$; and the frequency $f_4$ of the gate signal terminating pulse produced by reference signal generator 42 may be expressed as $f_4=f_3/32$.

While the present invention has been particularly shown and described with reference to a preferred embodiment, it should be readily appreciated by those of ordinary skill in the art that various changes and modifications in form and details may be made without departing from the spirit and scope of the invention. For example, in the preferred embodiment, the printer with which the present invention is used is a thermal printer. However, the teachings of this invention are equally applicable to other printers wherein the print materials used to print indicia exhibit non-linear print characteristics. If indicia of only a single color are printed, it is appreciated that address terminals $A_5A_6$ of ROM 56 may be omitted. Also, if indicia of different colors are printed but all of the color materials exhibit identical non-linear characteristics, then these address terminals likewise may be omitted. It is contemplated, therefore, that in its broadest aspects, the present invention is not necessarily limited only to thermal printing apparatus.

It is intended that the appended claims be interpreted as including the foregoing as well as other changes and modifications in the specifics of the circuitry illustrated in FIG. 2.

What is claimed is:

1. A method of controlling a printer of the type having plural print heads for printing indicia of different colors by transferring a color dye from a dye medium to a record medium, each print head supplied with an energizing signal for a time duration that determines the relative intensity of an indicium printed thereby, said method comprising the steps of:

providing respective image signals for said print heads, each image signal representing the intensity of the indicium to be printed by a corresponding print head;

generating a successively changing intensity level representation;

comparing in a predetermined sequence said image signals to said changing intensity level representation to produce respective energizing signals, each energizing signal being produced for a duration that is determined by the value of a corresponding image signal with respect to said changing intensity level representation; and varying the duration of an energizing signal as a function of the print characteristics of the dye medium from which said print heads print said indicia.

2. The method of claim 1 wherein said dye medium is provided with sections of different color dyes, at least one of which exhibits different print characteristics than the others.

3. The method of claim 2 wherein said printer is a thermal printer, each print head is energized to generate heat for transferring said color dye from a section of said dye medium to said record medium, and said different print characteristics of said at least one section include a different heating time duration to print an indicium of the same relative darkness.

4. The method of claim 3 wherein said at least one section exhibits a non-linear print characteristic, whereby the relative darkness of indicia printed from said at least one section is non-linearly related to the heating time duration that heat is applied thereto.

5. The method of claim 1 wherein each of said image signals is stored; wherein said step of comparing comprises cyclically reading out said stored image signals in said predetermined sequence for comparison with said intensity level representation; wherein said step of generating said intensity level representation comprises incrementing said intensity level representation by a predetermined incremental amount after an image signal read-out cycle; and wherein said step of varying the duration of an energizing signal comprises selectively varying the duration of said image signal read-out cycle.

6. The method of claim 5 wherein said step of selectively varying the duration of said image signal read-out cycle comprises selectively varying the rate at which said stored image signals are read out.

7. The method of claim 6 wherein said step of selectively varying the rate at which said stored image signal are read out comprises generating a clock pulse of substantially constant clock frequency; dividing the clock frequency by a controllable dividing ratio to produce a read-out clock signal; and changing said dividing ratio in synchronism with the incrementing of said intensity level representation.

8. The method of claim 7 wherein said step of changing said dividing ratio comprises storing sets of plural dividing ratios associated with the color dyes, respectively; selecting a set of stored dividing ratios as a function of the color dye to be transferred to said record medium; and reading out the selected dividing ratios in sequence such that a respective dividing ratio is read out at each image signal read-out cycle.

9. A method of controlling a thermal printer of the type having plural thermal print heads for printing indicia of different colors by applying heat for a selectable number of unit heat times to a dye medium to transfer a color dye therefrom to a record medium, the relative intensity of a color indicium printed by a head being determined by the number of unit heat times for which heat is generated by said head, said method comprising the steps of:

storing respective image signals for said print heads in addressable locations, each image signal having a value representing the intensity of the indicium to be printed by a corresponding head;

cyclically addressing said locations in predetermined sequence to cyclically read out said image signals;

generating an intensity level representation and incrementing said intensity level representation by a predetermined incremental amount after each image signal read-out cycle;

comparing the read out image signals to said intensity level representation to produce respective heat signals, each heat signal being produced for a number of unit heat times that is determined by the value of a corresponding read out image signal with respect to said intensity level representation;

supplying said heat signals to respective print heads to cause the latter to generate heat; and varying the rate at which said addressable locations are addressed and said intensity level representation is incremented as a function of the printing characteristics of said dye medium, thereby varying, in a predetermined manner, the duration of said unit heat time to compensate for non-linearities in the relationship between the intensity of a color indicium printed from said dye medium and the heating time during which heat is applied to that dye medium.

10. The method of claim 9 wherein said addressable locations are cyclically addressed by generating successive addresses at an address clock rate; and wherein said intensity level representation is incremented by generating an increment clock pulse when said generated addresses recycle.

11. The method of claim 10 wherein said step of varying the rate at which said addressable locations are addressed and said intensity level representation is incremented comprises generating a fixed frequency clock pulse; dividing the frequency of said fixed frequency clock pulse by a dividing ratio to produce an address clock at said address clock rate; and varying the dividing ratio in a predetermined manner.

12. The method of claim 11 wherein said step of varying the dividing ratio comprises storing plural dividing ratio representation at predetermined addressable locations; successively addressing said predetermined addressable locations in response to said increment clock pulse to read out the dividing ratio representations stored therein; and dividing the frequency of said fixed frequency clock pulse by said read out dividing ratio.

13. The method of claim 12 wherein said dye medium is provided with sections of respectively different color dyes having respectively different printing characteristics; wherein said plural dividing ratio representations comprise sets of dividing ratio representations, each set being associated with a respective color dye; and further comprising selecting a set of stored dividing ratio representations determined by the color dye then being used to print indicia for successive addressing.

14. Apparatus for controlling a printer of the type having plural energizable print heads for printing indicia of different colors by transferring a color dye from a dye medium to a record medium, each print head being supplied with an energizing signal for a time duration that determines the relative intensity of the indicium printed thereby, said apparatus comprising:

a source of image signals having respective values representing the intensities of indicia printed by said print heads;

reference signal generating means for generating a reference signal having a value which changes with time;

comparing means for comparing said image signals, in a predetermined sequence, with said reference signal to produce respective energizing signals of durations that are determined by the respective values of the image signals with respect to the value of said reference signal;

supply means for supplying said energizing signals to said print heads; and duration varying means for varying the durations of said energizing signals to compensate for different print characteristics of the dye medium from which said print heads print said indicia.

15. The apparatus of claim 14 wherein at least a portion of the print characteristics of said dye medium is non-linear.

16. The apparatus of claim 15 wherein the intensity of indicia printed from that portion of the dye medium having non-linear print characteristics does not vary linearly with the duration of the energizing signals that are produced to print indicia from said dye medium.

17. The apparatus of claim 16 wherein said dye medium is provided with sections of different color dyes, at least one color section exhibiting said non-linear print characteristics.

18. The apparatus of claim 17 wherein said duration varying means includes means for varying the durations of said energizing signals in a selected one of a plurality of different duration-varying patterns, and means for selecting one of said patterns as a function of the color section of the dye medium from which indicia are printed.

19. The apparatus of claim 17 wherein said source of image signals comprises storage means for storing said image signals in respective storage locations; said comparing means includes address generating means for cyclically generating addresses in said predetermined sequence at a read-out rate to read out the stored image signals during a read-out cycle for comparison with said reference signal; said reference signal generating means includes incrementing means for incrementing the value of said reference signal by a predetermined amount at the end of each read-out cycle; and said duration varying means includes means for varying said read-out rate and the rate at which said reference signal is incremented.

20. The apparatus of claim 19 wherein said means for varying said read-out rate comprises a source of clock pulses having a substantially fixed frequency; variable frequency divider means coupled to said clock pulse source for dividing the frequency of said clock pulses by a variable dividing ratio to produce address clock pulses, said address clock pulses being applied to said address generating means; and means for establishing the dividing ratio of said variable frequency divider means.

21. The apparatus of claim 20 wherein said means for establishing the dividing ratio of said variable frequency divider means comprises memory means for storing plural dividing ratio signals therein, each representing a respective frequency dividing ratio; read-out means for reading out from said memory means successive dividing ratio signals in synchronism with the incrementing of said reference signal; and means for supplying each read out dividing ratio signal to said variable frequency divider means.

22. The apparatus of claim 21 wherein said memory means includes a plurality of memory sections, each being associated with a respective color dye and each storing a respective set of dividing ratio signals; and wherein said read-out means includes means for selecting a memory section corresponding to the section of color dye from which indicia then are printed for reading out the stored dividing ratio signals therefrom.

23. The apparatus of claim 21 wherein said address generating means generates an output pulse at the end of each read-out cycle for incrementing said incrementing means; and said read-out means comprises counter means for counting the output pulses to produce a read-out count for reading out from said memory means a respective dividing ratio signal.

24. The apparatus of claim 23 wherein said memory means comprises a read only memory (ROM); and said counter means generates a ROM address.

25. The apparatus of claim 23 wherein said reference signal generating means comprises a reference counter supplied with the output pulses generated by said address generating means for producing a reference count for comparison with said read out image signals.

26. The apparatus of claim 25 wherein said comparing means is operative to produce an energizing signal for a duration which commences when the value of said reference count has been incremented to be equal to or greater than the value of the image signal compared thereto and which terminates at a predetermined time.

27. The apparatus of claim 26 wherein said supply means comprises buffer means for storing the energizing signals produced by said comparing means while said reference count is incremented from a minimum to a maximum; temporary storage means responsive to each output pulse generated by said address generating means to store the contents then present in said buffer means; gate signal generating means for generating a gating signal commencing when said reference count exhibits a predetermined value and terminating at said predetermined time; and means responsive to said gating signal for applying to said print heads the signals stored in said temporary storage means.

28. The apparatus of claim 27 wherein said printer is a thermal printer, each print head being energized by an energizing signal applied thereto to generate heat; and wherein said at least one color section of said dye medium exhibits a non-linear relationship between the intensity of the image printed therefrom and the duration that heat is applied thereto.

29. Apparatus for controlling a thermal printer of the type having plural thermal print heads and a dye medium of different color sections adjacent thereto, each print head being selectively energizable for a number of unit heat times to generate heat and thereby transfer dye from said dye medium to a record medium to print an indicium whose relative intensity is determined by the number of unit heat times that heat is generated by said print head, each color dye section exhibiting a different non-linear relationship between the relative intensity of the indicia printered therefrom and the number of unit heat times during which heat is applied thereto; said apparatus comprising:

storage means for storing image signals representing the intensities of the indicia to be printed by said print heads, respectively, said storage means having addressable locations therein;

cyclical address generating means for cyclically addressing said storage means to read out the stored image signals in a predetermined sequence and for generating a unit heat time pulse after completing a read-out cycle;

reference counting means for counting said unit heat time pulses to produce a reference count of changing value;

comparator means for comparing the image signals sequentially read out of said storage means to each reference count so as to produce respective energizing signals which commence when said reference count is incremented to a value at least equal to the value of the respectively read out image signals and which terminate at a predetermined time;

supply means for supplying said respective energizing signals to print heads to energize the latter for numbers of unit heat times determined by the durations of said respective energizing signals; and varying means for varying at least the period of said unit heat time pulse as a function of said reference count and the color dye section from which indicia then are printed.

30. The apparatus of claim 29 wherein said varying means additionally is operative to vary the rate at which said cyclical address generating means addresses said storage means.

31. The apparatus of claim 30 wherein said varying means comprises a source of clock pulses having a substantially constant repetition rate; frequency divider means coupled to said source for dividing the repetition rate thereof by a dividing ratio; means for storing different sets of dividing ratio signals, each set being associated with a respective color dye section and the dividing ratio signals in each set representing respective frequency dividing ratios for compensating the non-linear relationship between the relative intensity of the indicium printed from the associated color dye section and the number of unit heat times during which heat is applied thereto; selecting means for selecting a set of stored dividing ratio signals in accordance with the color dye section from which indicia then are printed; and read-out means for reading out successive dividing ratio signals form the selected set in synchronism with said unit heat time pulses and for supplying same to said frequency divider means.

32. The apparatus of claim 31 wherein said read-out means comprises a counter whose count is incremented by said unit heat time pulses.

33. The apparatus of claim 32 wherein said means for storing dividing ratio signals comprises a read only memory having storage locations addressable by said last-mentioned counter.

* * * * *